United States Patent [19] [11] 3,953,404
Borman [45] Apr. 27, 1976

[54] SOLID STATE POLYMERIZATION OF POLY(1,4-BUTYLENE TEREPHTHALATE)
[75] Inventor: Willem F. H. Borman, Pittsfield, Mass.
[73] Assignee: General Electric Company, Pittsfield, Mass.
[22] Filed: Feb. 7, 1974
[21] Appl. No.: 440,443

[52] U.S. Cl. .............................. 260/75 M
[51] Int. Cl.² ......................... C08G 63/26
[58] Field of Search ................... 260/75 M

[56] References Cited
UNITED STATES PATENTS

| | | | |
|---|---|---|---|
| 3,075,952 | 1/1963 | Coover et al. | 260/75 |
| 3,453,240 | 7/1969 | Plaster et al. | 260/75 |
| 3,728,309 | 4/1973 | Maxion | 260/75 |
| 3,801,547 | 4/1974 | Hoeschele | 260/75 |
| 3,814,786 | 6/1974 | Gall et al. | 264/98 |

FOREIGN PATENTS OR APPLICATIONS

| | | |
|---|---|---|
| 1,926,987 | 12/1969 | Germany |
| 1,900,270 | 11/1969 | Germany |

OTHER PUBLICATIONS

Kibler et al., Def. Pub. of S.N. 25,270, filed 2/4/70, published in 827 O.G. 5 on 6/1/71, Def. Pub. No. T887,005, Chemical Week, Mar. 13, 1974, pp. 34–35.

Primary Examiner—Murray Tillman
Assistant Examiner—W. C. Danison, Jr.
Attorney, Agent, or Firm—William F. Mufatti; Edward A. Hedman; James V. Costigan

[57] ABSTRACT

An improved process for the solid-state polymerization of poly(1,4-butylene terephthalate) is disclosed. The process is based on carrying out the polymerization in an inert atmosphere which includes a minor amount of 1,4-butanediol.

11 Claims, No Drawings

SOLID STATE POLYMERIZATION OF POLY(1,4-BUTYLENE TEREPHTHALATE)

This invention relates to an improved process of preparing higher molecular weight poly(1,4-butylene terephthalate). More particularly, it provides a novel procedure for the solid-state polymerization of poly(1,4-butylene terephthalate) that is carried out in the presence of an inert atmosphere and a minor amount of 1,4-butanediol.

BACKGROUND OF THE INVENTION

Articles manufactured from poly(1,4-butylene terephthalate) have many valuable characteristics, including strength, toughness, solvent resistance, high gloss, and the like. These articles may be fabricated by a number of well-known techniques, including injection molding, roto molding, blow molding, extrusion, and the like, depending on the shape of the desired product.

Certain of these techniques, in particular, blow molding and extrusion, require that the molten poly(1,4-butylene terephthalate) have a suitably high melt viscosity, e.g., in excess of 10,000 poises, to prevent collapse or blow-outs in the soft preformed state. It has been found that poly(1,4-butylene terephthalates) of such high melt viscosity are obtained only with great difficulty in the conventional bulk melt polymerization processes generally used to prepare the polyester. This is probably because 1,4-butanediol must be eliminated to increase molecular weight and the last traces are difficult to remove from the hot, viscous melt. In most cases, the intrinsic viscosity (measured at 30°C. in a 60:40 mixture of phenol and tetrachloroethane) reaches a level of about 0.2 to 1.2 deciliters per gram and then stabilizes, with 0.85–1.05 dl./g. generally being the practical maximum. In addition, polymer melts with a melt viscosity greater than 10,000 poises become increasingly difficult to handle and to remove from commonly used bulk polymerization equipment, leading to degradation and discoloration of the products.

Solid-state polymerization is a known technique for increasing the intrinsic viscosity of poly(ethylene terephthalate). This gives a polyester which will produce a higher-tenacity industrial yarn. Thus, in U.K. Pat. No. 1,066,162 it is disclosed that when this linear polyester is heated at temperatures below its point of thermal decomposition, in a vacuum, coupling of the polymer chains produce increases in molecular weight.

However, it is also known that under such conditions, undesirable depolymerization by ester interchange is equally favored with the desired chain coupling molecular weight increase. H. A. Pohl, J. Am. Chem. Soc., 73, 5660 (1951) has studied th relative rates of decomposition and reported that the terephthalate polyester of ethylene glycol was much more stable than the polyester with decamethylene glycol. In other words, the decamethylene glycol terephthalate polymer decomposes on heating by evolving gas, changing color and liberatig acid much more readily than the corresponding ethylene glycol terephthalate polymer.

In copending application Ser. No. 415,161, it has been disclosed that poly(butylene terephthalate) with a very high melt viscosity (corresponding to an intrinsic viscosity of greater than about 1.05 deciliters per gram) can be obtained by heating a solid, particulate form of poly(1,4-butylene terephthalate) of lower intrinsic viscosity, e.g., 0.7–1.0 dl./g. at a temperature of about 150°C. and below the melting or sticking point of the particles, for a period of time varying from ½ hour to several days, or longer, depending on the temperature, and the intrinsic viscosity desired. The poly(1,4-butylene terephtaalate) will also preferably include small quantities of branching agents.

It is most unexpected to find that such a polyester, which has a higher number of carbon atoms in the alkylene units than in poly(ethylene terephthalate), can be heated without decomposition in view of the teachins of Pohl. Moreover, another surprising difference between solid-state polymerization of poly(1,4-butylene terephthalate) in comparison with poly(ethylene terephthalate) is the high rate at which the increase in intrinsic viscosity occurs with the former at relatively low reaction temperatures and at atmospheric pressure, instead of under high vacuum.

When the solid particulate form of poly(1,4-butylene terephthalate) is polymerized according to the above-disclosed method, it has been found that the polymer molecules on the outer surfaces of the individual particles polymerize at a higher rate than the polymer which is in the interior of the individual particles due to the greater ease with which the polymerization by-product glycol is removed from the surface of the cubes. As a result the "skin" of the individual particles tends to gel before the bulk of the mass has polymerized to the desired extent. This is disadvantageous as the presence of insoluble and infusible gel particles in a thermoplastic material is undesirable, since they interfere with normal processing procedures, and affect the properties and appearance of molded articles. This is sometimes a particularly serious problem with branched copolyesters.

Therefore, it is an object of this invention to provide a controlled solid-state polymerization process for poly(1,4-butylene terephthalate) which proceeds at a controlled rate.

It is also an object of this invention to provide a solid state polymerization process which may be employed to produce higher molecular weight poly(1,4-butylene terephthalate).

These and other objects of the invention will be readily apparent from a reading of the following description of the invention and description of the preferred embodiments.

DESCRIPTION OF THE INVENTION

According to the present invention, there is provided a process for the solid-state polymerization of poly(1,4-butylene terephthalate) and branched copolyesters thereof that include from 0.01 to 3 mole percent, based on the terephthalate units, of units of a branching component which contains at least three ester-forming groups, said polyester having an intrinsic viscosity of greater than about 1.05 deciliters per gram, meaasured as a solution in a 60:40 mixture of phenol and tetrachloroethane at 30°C., said process comprising:

a. transforming a corresponding polyester having an intrinsic viscosity of from about 0.1, preferably about 0.5, to about 1.0 deciliters per gram as measured in a 60:40 mixture of phenol and tetrachloroethane at 30°C., into a solid particulate state; and b. heating the particles of solid polyester at a temperature of above 150°C. and below the melting point of said polyester in the presence of an inert gas and a minor amount of 1,4-butanediol until the desired degree of increase in intrinsic viscosity is obtained.

The melt viscosity is determined under the conditions specified in the Examples. Typically, a "high melt viscosity" resin is of greater than about 7,500 poises and generally in excess of about 10,000 poises at 250°C. In general, high melt viscosity resins will have an intrinsic viscosity, measured under the conditions stated later, in excess of about 1.1 dl./g.

The polyester resins with which this invention is concerned are, in general, saturated condensation products of 1,4-butanediol and terephthalic acid, or reactive derivatives thereof, e.g., dimethyl terephthalate. Preferably, they are branched either by cross-linking through chemical linkages or in other known manners. They may contain minor amounts, e.g., from 0.5 to 15 mole percent of the total 1,4-butylene units, of other aliphatic linkages, e.g., those of from 2 to 10 carbon atoms, such as dimethylene, trimethylene, hexamethylene, decamethylene, and the like, linkages, as well as cycloaliphatic, e.g., 1,4-dimethylene-cyclohexane linkages. In addition to the terephthalic acid units, other dicarboxylic acid units, such as adipic, naphthalene dicarboxylic, isophthalic and orthophthalic units may be present in small amounts, e.g., from about 0.5 to about 15 mole percent of the total acid units.

Especially useful are branched high melt viscosity poly(1,4-butylene terephthalate) resins, which include a small amount of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or, preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate, and the like.

The branched copolyesters are especially preferred starting materials because the final properties are better for a broad number of uses where high melt strength is important. Moreover, such branched materials, for reasons not clearly understood at this time, appear to reach a higher intrinsic viscosity more rapidly than the unbranched, or linear material which can also be used in this process.

The relative amount of branching component can vary, but is always kept at a minor proportion, e.g., of up to 5 mole percent maximum, for every 100 moles of the terephthalate units in the branched polyester. Preferably, the range of branching component included in the esterification mixture (and, generally, that included in the product), will be from 0.01 to 3 mole percent based on the terephthalate units. Especially preferably, it will comprise from about 0.02 to about 1 mole percent, based on the terephthalate component.

Processes for preparing the polyester starting materials used in this process are well known to those skilled in the art. The descriptions in U.S. Pat. Nos. 3,465,319; 3,047,539 and 3,692,744 are helpful. Procedures for several branched polyesters will be detailed hereinafter.

The general procedure for making the starting resins is a condensatiion in the melt state, using an excess of the butanediol and a dialkyl terephthalate or terephthalic acid and any desired branching component. Heat (250°–260°C.) and high vacuum (0.2–1.0 mm Hg) are used for a long enough time, e.g., 3 to 12 hours, to build the molecular weight by eliminating volatile by-products. It has been found that the resin used as starting material in this solid state process should have an intrinsic viscosity of at least about 0.1 dl./g. and preferably 0.5, but less than about 1.0 dl./g. Moreover, it should be predominantly hydroxyl terminated. If the intrinsic viscosity is below 0.5, the 1.05 minimum will be reached, but in a longer time. Both of these requirements are achieved easily, the first by carrying out the condensation for sufficient time until a sample reaches the desired intrinsic viscosity, and the second by using an excess of the diol component in the reaction mixture.

The process of this invention is carried out in two steps, first, transforming the polyester to a solid particulate state and, second, heating the particles until the desired degree of increase in intrinsic viscosity is obtained.

Experiments have shown that pellets, e.g., extruded and chopped cubes, cylinders, spheres, irregular shapes, and the like, of up to ¼ inch maximum dimension, react in the solid state as well as the ground polymer, in the long run. However, to obtain a more homogeneous polymer, especially when using branched polyesters, grinding of the feed is preferable. It is convenient to grind the feed, e.g., by passing it through a mill with dry ice cooling, using a coarse screen.

With respect to the heating stage, experiments have shown that solid state polymerization proceeds readily at temperatures above about 150°C. The rate is especially rapid at 200°C. or 210°C., and measurably slower at 150° or 160°C. The most preferred temperature range is between 180° and 210°C. and especially between 190° and 210°C.

The preferred inert gas is nitrogen, although if desired, argon, helium, carbon dioxide, or mixtures thereof with or without nitrogen may be employed.

The concentration of the 1,4-butanediol may be controlled by sparging the inert gas through a zone wherein the 1,4-butanediol is heated to a selected temperature which provides a predetermined 1,4-butanediol vapor pressure in the inert gas stream. Generally, it is preferred to maintain a concentration of 1,4-butanediol in the inert gas stream so that the vapor pressure of the 1,4-butanediol is about 0.2 to about 3.0 mm Hg. It will be understood that temperature and pressure of the reaction zone may be varied to achieve this value. For example, it has been found that a vapor pressure of about 0.3 mm Hg of 1,4-butanediol is obtained at approximately 60°C. and atmospheric pressure. If desired, the process may be run at sub-atmospheric or super-atmospheric pressure and the concentration of 1,4-butanediol may be adjusted accordingly.

Alternately, the desired butanediol concentration in the inert gas stream may be obtained by metering the calculated amount of butanediol into a heated evaporation zone from where the vapors are carried into the reaction zone, either by the main inert gas stream, or by an auxiliary stream of inert gas which joins the main inert gas stream before the latter enters the reaction zone.

The particles can be in a fixed or fluidized bed during the heating step. The particles can be agitated in any conventional manner, if desired. A slow stream of nitrogen can provide agitation, removal of volatiles and an inert atmosphere.

The time required for step (b) of the process can vary, depending on the temperature and the intrinsic viscosity desired. In general, it will be between about ½ hour and several days, e.g., up to 96 hours, or longer. As will be seen from the examples, ungelled polymer having an intrinsic viscosity of up to 1.80, and higher, can be obtained in only 16 hours at 200°C. and atmospheric pressure.

While applicant does not wish to be bound by any theory as to the operation of the process of the invention, it is believed that the presence of the 1,4-butanediol in the inert gas prevents the polymerization from proceeding beyond the molecular weight in equilibrium with the 1,4-butanediol vapor pressure in the inert gas. As a result, the polymerization of the skin, fines and tails in the sample will essentially stop, while the bulk of the polymer continues to polymerize until it has reached the equilibrium molecular weight.

An additional feature of this invention is the unexpected finding that higher molecular weight poly(1,4-butylene terephthalate) made according to the disclosed process are unexpectedly white in color which is believed to be due to the action of the hot 1,4-butanediol. This is of particular importance when white or pastel colored objects are to be molded from poly(1,4-butylene terephthalate).

The polyester products of this invention can be combined with conventional additives, such as reinforcements, stabilizers, antioxidants, plasticizers, lubricity promoters, dyes, pigments, flame retardant additives, and the like. The products are useful for all fabricating purposes, but especially so for blow molding and extrusion.

DESCRIPTION OF THE PREFERRED EMBODIMENTS

The following non-limiting examples illustrate the process of this invention.

EXAMPLES 1 and 2

A branched polyester is prepared from 1,4-butanediol and dimethylterephthalate, with the addition of 0.215 mole percent pentaerythritol. The product is diced into 3/32 inch cubes. The intrinsic viscosity (in 60:40 phenol-tetrachloroethane at 30°C.) is 0.88 dl./g.

A portion of the cubes is ground into a medium-fine powder; mixtures of the powder and pellets are placed in four 25 × 200 mm test tubes and immersed in an oilbath maintained at 200°C. for 16 hours. The samples are purged with nitrogen (flow rate 75 cc/min) which has been sparged through 1,4-butanediol, held at various temperatures to obtain different diol vapor pressures in the nitrogen stream.

The results of the four processes are as follows:

| | Butanediol Temperature (°C) | Estimated Vapor Pressure (mmHg) | Intrinsic Viscosity (dl/g) Pellets | Powder |
|---|---|---|---|---|
| Example | | | | |
| A* | 25 | 0.02 | Gel | — |
| 1 | 60 | 0.3 | 1.80 | 1.85 |
| 2 | 75 | 0.8 | 1.17 | 1.20 |
| B* | 100 | 3.4 | 0.67 | 0.66 |

*Comparison

The results show that the concentration of the diol in the nitrogen control the intrinsic viscosity of the product. At the highest diol vapor pressure (Control B) it is even possible to reduce the I.V. to a lower value than the original; in Examples 1–2, the pellets and powder polymerized to the same extent.

EXAMPLES 3 – 7

Several copolymers of poly(1,4-butylene terephthalate) with varying concentrations of trimethylolethane (TME) branching agent are prepared by melt polymerization. The products are ground to a powder, placed in a stirred reaction flask immersed in an oilbath, and subjected to solid state polymerization at 210°C. in a stream of nitrogen gas saturated with 1,4-butanediol vapors at several different temperatures. The results are as follows:

| Example | TME Concentration (mole %) | Initial I.V. (dl/g) | Butanediol Temp. (°C.) | Butanediol Pressure (mmHg) | Time (hrs.) | Final I.V. (dl/g) |
|---|---|---|---|---|---|---|
| 3 | 0.13 | 0.65 | 65 | 0.45 | 17 | 1.60 |
| 4 | 0.217 | 0.85 | 60 | 0.3 | 19 | 1.72 |
| 5 | 0.217 | 0.85 | 71 | 0.7 | 15.5 | 1.23 |
| 6 | 0.33 | 0.57 | 70 | 0.65 | 17 | 1.16 |
| 7 | 0.33 | 0.57 | 80 | 1.2 | 21.5 | 1.06 |

None of the products contained insoluble gel.

EXAMPLES 8 – 11

By the procedure of Examples 3–7, a series of branched copolymers containing pentaerythritol (PE) branching agent are subjected to solid state polymerization at 210°C.:

| Example | PE Concentration (mole %) | Initial I.V. (dl/g) | Butanediol Temp. (°C.) | Butanediol Pressure (mmHg) | Time (hrs.) | Final I.V. (dl/g) |
|---|---|---|---|---|---|---|
| 8 | 0.043 | 0.81 | 60 | 0.3 | 14.5 | 1.42 |
| 9 | 0.043 | 0.81 | 70 | 0.65 | 14 | 1.30 |
| 10 | 0.33 | 0.71 | 70 | 0.65 | 19 | 1.67 |
| 11 | 0.33 | 0.71 | 80 | 1.2 | 18.5 | 1.17 |

The starting materials for Examples 8 and 9 consist of ⅛ inch cubes; for Examples 10 and 11 they consist of ground material. No formation of insoluble gel is observed in any case.

COMPARATIVE EXAMPLE C

Five hundred pounds of a copolymer of poly(1,4-butylene terephthalate) with 0.215 mole % pentaerythritol (I.V. = 0.8 dl/g) is charged to an oil-jacketed tumbler-dryer. Hot oil is circulated through the jacket to heat the polymer pellets (approximately ⅛ inch cubes) to 210°C. The charge is heated and tumbled for 11 hours while dry nitrogen is passed through the reactor at a rate of 5 standard cubic feet per hour. At the end of this time, a sample of the material is subjected to the following analysis:

One gram of the pellets is placed in 25 ml. of a 60/40 mixture of phenol and tetrachloroethane and heated with stirring until the outside of the pellets has gone in solution. The solution is decanted from the remaining pellets and added to an excess of methanol to precipitate the dissolved product. The precipitate is collected by centrifugation, repeatedly washed with methanol and dried.

The remainder of the pellets is dissolved in a second 25 ml. portion of phenol tetrachloroethane, precipitated and washed with methanol and dried. The two fractions thus obtained are subjected to intrinsic viscosity determinations.

The first fraction, consisting of the outside of the pellets (representing 23.5% of the total sample weight) is found to have an I.V. of 1.71 dl/g. The inside of the pellets (the remaining 76.5%) have an I.V. of 1.40 dl/g. This shows that in the absence of butanediol in the inert gas, a pronounced I.V. gradient develops in the pellets.

EXAMPLE 12

The procedure of Comparative Example C is repeated, except that butanediol vapor is injected into the nitrogen stream to provide a vaporpressure of approximately 1.2 mm of mercury. After a reaction time of 16½ hours the product is removed from the reactor and analyzed as set forth in Comparative Example C. It is found that the outer 33% of the pellets have an I.V. of 1.18 dl/g, while the inner 67% have an I.V. of 1.23 dl/g. The presence of the butanediol in the nitrogen is seen to moderate the reaction and to minimize the molecular weight difference between the inside and the outside portions of the pellets.

The homogeneity (minimal I.V. variations) shown by the products obtained by this invention is important, since large variations in molecular weight cause unstable extrusion conditions resulting in parts (either extruded or blow-molded) with rough surfaces and less than optimum mechanical strength.

Obviously, other modifications and variations of the present invention are possible in the light of the above teachings. It is, therefore, to be understood that changes may be made in the particular embodiment described which will be within the full intended scope of the invention as defined by the appended claims.

I claim:

1. A method for the solid-state polymerization of a high melt viscosity branched copolyester of poly(1,4-butylene terephthalate) that includes from 0.01 to 3 mole percent, based on the terephthalate units, of units of a branching component which contains at least three ester-forming groups, said polyester having an intrinsic viscosity of greater than about 1.05 deciliters per gram, measured as a solution in a 60:40 mixture of phenol and tetrachloroethane at 30°C., said process comprising:
   a. transforming a corresponding polyester having an intrinsic viscosity of from about 0.1 to about 1.0 deciliters per gram as measures as a solution in a 60:40 mixture of phenol and tetrachloroethane at 30°C. into pellets; and
   b. heating the particles of solid polyester at a temperature of about 150°C. and below the melting point of said polyester in the presence of a mixture of an inert gas and a minor amount of 1,4-butanediol, which is formed by passing said inert gas through a heated zone containing said 1,4-butanediol, until the desired degree of increase in intrinsic viscosity is obtained.

2. A process as defined in claim 1 wherein heating step (b) is carried out between 150° and 210°C.

3. A process as defined in claim 2 wherein heating step (b) is carried out between 180° and 210°C.

4. A process as defined in claim 3 wherein heating step (b) is carried out between 190° and 210°C.

5. A process as defined in claim 1 wherein the inert gas is nitrogen.

6. A process as defined in claim 1 wherein the branching component is a polyol.

7. A process as defined in claim 6 wherein the branching component is trimethylolethane.

8. A process as defined in claim 7 wherein said branching component is pentaerythritol.

9. A process as defined in claim 1 wherein the branching component is a tricarboxylic acid, a tetracarboxylic acid or a low alkyl ester thereof.

10. A process as defined in claim 9 wherein said branching component is trimethyl trimesate.

11. A solid-state process for the preparation of a high melt viscosity branched copolyester of poly(1,4-butylene terephthalate) and from 0.01 to 3 mole percent, based on the terephthalate units, of units of a branching component which contains at least three ester-forming groups, said polyester having an intrinsic viscosity of greater than about 1.05 deciliters per gram, measured as a solution in a 60:40 mixture of phenol and tetrachloroethane at 30°C., said process consisting essentially of;
   a. transforming a corresponding polyester having an intrinsic viscosity of from about 0.5 to about 1.0 deciliters per gram into pellets; and
   b. heating the pellets of said solid polyester in an inert atmosphere in the presence of a minor amount of 1,4-butanediol, which is formed by passing said inert gas through a heated zone containing said 1,4-butanediol, at a temperature of above 150°C. and below the melting point thereof until the desired degree of increase in intrinsic viscosity is obtained.

* * * * *